US006762721B2

(12) United States Patent
Halsey et al.

(10) Patent No.: US 6,762,721 B2
(45) Date of Patent: Jul. 13, 2004

(54) URBAN TERRAIN GEOLOCATION SYSTEM

(75) Inventors: J. Doss Halsey, Falls Church, VA (US); Douglas J. Wolff, New Windsor, MD (US)

(73) Assignee: Information Systems Laboratories, Inc., San Diego, CA (US)

(*) Notice: Subject to any disclaimer, the term of this patent is extended or adjusted under 35 U.S.C. 154(b) by 0 days.

(21) Appl. No.: 10/269,667

(22) Filed: Oct. 12, 2002

(65) Prior Publication Data
US 2004/0070534 A1 Apr. 15, 2004

(51) Int. Cl.[7] ................................................. G01S 5/04
(52) U.S. Cl. ....................................... 342/442; 342/464
(58) Field of Search ................................ 342/442, 450, 342/463, 464

(56) References Cited

U.S. PATENT DOCUMENTS

| | | | | |
|---|---|---|---|---|
| 4,021,807 A | * | 5/1977 | Culpepper et al. | 343/112 R |
| 5,227,803 A | * | 7/1993 | O'Connor et al. | 342/442 |
| 5,280,295 A | * | 1/1994 | Kelley et al. | 342/463 |
| 5,504,477 A | * | 4/1996 | Whitright et al. | 340/825.5 |
| 5,552,772 A | * | 9/1996 | Janky et al. | 340/573 |
| 5,568,119 A | * | 10/1996 | Schipper et al. | 340/825.37 |
| 5,936,572 A | * | 8/1999 | Loomis et al. | 342/357 |
| 6,181,253 B1 | * | 1/2001 | Eschenbach et al. | 340/825.37 |
| 6,433,740 B1 | * | 8/2002 | Gilhousen | 342/442 |
| 6,577,273 B2 | * | 6/2003 | Hamada et al. | 342/442 |

* cited by examiner

Primary Examiner—Dao Phan
(74) Attorney, Agent, or Firm—Nydegger & Associates

(57) ABSTRACT

A system for tracking a moveable object such as a soldier in an urban environment includes a receiver that is positioned on the movable object and a plurality of signal transmitters. The transmitters are mutually dispersed at known locations within the urban environment and each transmitter is configured to generate a low frequency electromagnetic signal capable of penetrating into buildings in the urban environment. At the receiver, phase related information and the receiver location information are extracted from received signals and used to determine the location of the receiver. Phase related ambiguities can be eliminated by a processor to find the real receiver position using an algorithm such as the maximum likelihood method (MLM) algorithm. Once the real receiver position is calculated, it can be transmitted to a central location using a low probability of intercept (LPI) waveform to prevent hostile parties from intercepting the location of the soldier.

21 Claims, 2 Drawing Sheets

URBAN TERRAIN GEOLOCATION SYSTEM

FIELD OF THE INVENTION

The present invention pertains generally to a system for locating and tracking moving objects. More particularly, the present invention pertains to systems and methods that are useful for locating the position of soldiers or emergency personnel in an urban environment. The present invention is particularly, but not exclusively, useful as a portable, accurate system capable of being rapidly setup to track and locate the position of soldiers or emergency personnel anywhere within an urban environment.

BACKGROUND OF THE INVENTION

There are many circumstances in which there is a need to establish the accurate positioning and tracking of movable objects or individuals. This is particularly so when the individual or object is moving in a hostile or dangerous environment. One example is when a soldier enters a structure in an urban environment during a military operation. Another example is when a SWAT team member enters a structure during a rescue operation. In situations such as these, there is a need to determine and track the position of an object (i.e. a soldier or SWAT team member) with accuracies of approximately one meter. Although an object's position can be accurately determined outdoors using the current global positioning system (GPS), the GPS system is unsuitable, without augmentation, for locating moving objects indoors at accuracies of approximately one meter.

A system that can accurately determine an object's position in an urban environment can be used to provide soldiers/rescue personnel with situational awareness. More specifically, a desirable system would provide each soldier/rescuer with information regarding the position and movements of other soldiers/rescue personnel in the area. Of course, it is important that the soldier's position is not broadcast to hostile forces. For example, a positioning system that requires a soldier to carry a continuous wave signal transmitter is unsuitable for operations within a hostile urban environment because a hostile party could receive the continuous wave and locate the soldier.

To accurately locate and track objects or individuals inside or adjacent to a structure, the tracking signal that is used by the system must have good penetration and little distortion through the walls and other features of the structures. Lack of adequate signal penetration can result in a loss of signal strength which in turn can cause unacceptable location errors. Also, the signal should have low deflection (refraction and diffraction) to reduce the presence of multipath signals which limit location accuracy. Further, to locate an object's position accurately indoors, a system must provide sufficient coverage, and be able to acquire the signals quickly.

Unfortunately, radiofrequency (RF) systems using high frequency signals are limited in their ability to penetrate the walls and features of a structure. Also, because high frequency signals have wavelengths that are much shorter than the size of typical structural features such as rooms, hallways and staircases, these features can act as waveguides for the high frequency waves, altering the path of the signal. On the other hand, low frequency RF signals offer the potential to penetrate the walls and features of a structure and overcome inaccuracies due to fading and path length perturbations caused by diffraction and reflection. Further, since the wavelength of the low frequency waves are approximately the same or greater than the size of typical structural features, the features do not act as waveguides for the low frequency waves. Consequently, low frequency RF signals having wavelengths approximating the size of structural features are preferred over high frequency signals for use in and around structures.

Traditional positioning technologies use time-of-arrival and the angle-of-arrival methods. In a typical time-of-arrival system, the system measures the time of arrival of a marker modulated onto a signal to determine range. However, in time-of-arrival systems, increased resolution can only be obtained at the expense of increased bandwidth. By way of example, for a desired locating accuracy of one meter, a typical ranging system based on time of arrival requires a bandwidth on the order of tens of MHz. Unfortunately, this much bandwidth (tens of MHz) is unavailable at the low frequencies required for indoor use.

Another traditional positioning technology is the angle-of-arrival system. Typically, the angle of arrival is measured with array antennas or spinning real-aperture antennas. To achieve an unambiguous angle measurement commensurate with a one meter cross-range resolution at a one kilometer distance, each individual antenna (or array) must be on the order of 15 wavelengths across. Consequently, for the low frequency RF signals required for indoor locating, each antenna would be quite large and costly. Such large antennas are unsuitable when a locator system having small, portable equipment that can be setup quickly is desired.

Considering the above, it is an object of the present invention to provide a wireless system for locating and tracking the position of a soldier within an urban environment with accuracies of approximately one meter. Another object of the present invention is to provide a wireless system for accurately locating the position of a soldier that uses penetrating, low frequency RF signals, and requires only a minimal amount of bandwidth. Still another object of the present invention is to provide a wireless system for accurately locating and tracking the position of a soldier who is situated inside or adjacent to a structure without revealing the soldier's location to hostile forces. It is still another object of the present invention to provide a wireless locating and tracking system that can be configured to provide situational awareness to personnel situated inside or adjacent to a structure. Yet another object of the present invention is to provide a wireless locating system that is easy to use, relatively simple to implement, and comparatively cost effective.

SUMMARY OF THE INVENTION

A system and method for locating and tracking a movable object such as a soldier in a hostile, urban environment includes a receiver positioned on the movable object for movement therewith and a plurality of signal transmitters. For the present invention, the signal transmitters are mutually dispersed at known locations and each signal transmitter is configured to generate a low frequency electromagnetic signal. More specifically, a low frequency signal is used to ensure that the signal will penetrate into buildings in the urban environment. Additionally the frequency of the signal is selected to prevent features of the urban environment from acting as waveguides for the signal and altering the path of the signal. These features of the urban environment that can act as waveguides include rooms, hallways, staircases and passageways between large buildings. For the present invention, the signals generated by the transmitters have a wavelength that is substantially longer than the pertinent dimensions of the urban environment features to prevent these features from acting as waveguides. A typical frequency for use in the present invention is between approximately 500 kHz and approximately 2 Mhz.

Importantly, each signal transmitter is synchronized with the other signal transmitters to allow the generated signals to be in-phase with each other as they are generated by the signal transmitters. On the other hand, when the transmitted signals reach the receiver, the transmitted signals will no longer necessarily be in-phase. This is because each signal will most likely travel a different distance to reach the receiver.

As indicated above, for the present invention, the location of each signal transmitter must be known. For this purpose, each signal transmitter can be bundled with a GPS locating device to self-survey. After acquiring its own location, each signal transmitter relays its location information (along with the low frequency signal) to the receiver. For example, the transmitter location information can be modulated on the low frequency signal. Thus, the system is designed to accommodate an application wherein the transmitters are placed at outdoor locations where accurate GPS location is possible, yet the soldier (and receiver) to be located may be indoors where the accuracy of GPS is inadequate. More specifically, transmitters can be placed on soldiers, vehicles, and equipment and activated (when the transmitters are outdoors) to generate the low frequency signal. In some situations, it is contemplated by the present invention that the transmitters will be 'dropped' by soldiers at outdoor locations within the urban environment. For example, a soldier can drop a transmitter outside a structure as the soldier enters the structure. Thus, with the dropped transmitters positioned away from soldiers, hostile forces are prevented from identifying soldier locations by homing in on the transmitters.

At the receiver, each transmitted signal is received. For each received signal, phase related information and the transmitter location information are extracted from the signal. Also at the receiver, the phase related information and transmitter location information are processed to determine the location of the receiver. In one embodiment of the present invention, the receiver includes an on-board oscillator that is synchronized with the signal transmitters. In this embodiment, the phase of each received signal is measured with respect to the on-board oscillator (i.e. actual phase delays are measured) to determine the distance that each signal has propagated from its respective transmitter to the receiver. It is to be appreciated that each actual phase delay can represent several possible propagation distances, with the possible propagation distances differing by a distance equal to the wavelength of the low frequency signal. As detailed further below, these phase-related ambiguities can be eliminated, allowing the location of the receiver (and soldier) to be calculated from the propagation distances using triangulation algorithms that are well-known in the pertinent art.

In an alternate embodiment of the present invention, an on-board oscillator is not required. Instead, relative phase delays between received signals are used to determine the location of the receiver (and soldier). For a system having three transmitters, it is to be appreciated that three relative phase delays can be calculated. More specifically, a first phase delay for signals from transmitters one and two, a second phase delay for signals from transmitters one and three and a third phase delay for signals from transmitters two and three can be calculated.

Each relative phase delay is indicative of a differential range estimate for the transmitter pair used to calculate the relative phase delay. Specifically, the differential range estimate indicates the difference between the distance from the receiver (and soldier) to one transmitter in the pair and the distance from the receiver to the other transmitter in the pair. It is to be appreciated that phase related ambiguities similar to those described above may also be present in the differential range estimates. As detailed further below, these phase related ambiguities can be resolved and the location of the receiver (and soldier) can be calculated from the differential range estimates using triangulation algorithms that are well-known in the pertinent art.

In each of the embodiments described above, the phase related ambiguities can be eliminated by a processor to find the real receiver position. It is to be appreciated that the number of ambiguities will depend on the transmitter signal wavelength and the coverage area. Several techniques can be used to reduce or eliminate the ambiguities. For example, increasing the number of transmitters will generally reduce the number of ambiguities. A preferred technique involves using an algorithm such as the maximum likelihood method (MLM) to eliminate the phase related ambiguities and find the real receiver position. Another technique involves determining an initial position for the receiver, followed by tracking the movement of the receiver relative to the initial position. This technique allows for some of the ambiguous positions to be eliminated as improbable in light of any known limitations on receiver movement. For example, it can be assumed that the soldier and receiver do not move faster than an average soldier's foot speed, plus a factor of safety.

Another technique for eliminating ambiguities involves using transmitters that transmit multiple frequencies. Here, each frequency produces a set of possible receiver positions. The set of possible receiver positions produced at one frequency can then be compared to the set of possible receiver positions produced at a second frequency and any possible receiver positions that are not common to both sets can be eliminated as ambiguities. Once the ambiguities have been eliminated, the remaining position is the real position of the receiver relative to the signal transmitters. It is to be appreciated that a combination of the above-described techniques can be used to reduce or eliminate phase related ambiguities.

Once the real position of the receiver is calculated, the real position can be displayed at the receiver for use by the soldier or the receiver position can be transmitted to a central location. Preferably, a low probability of intercept (LPI) waveform is used to transmit the receiver location to the central location to prevent hostile parties from intercepting the location of the soldier. For the purposes of the present disclosure, the term 'low probability of intercept waveform' is defined as a waveform which, because of its low power, high directivity, frequency variability or other design attributes, make it difficult to be detected or identified by passive devices. A burst communication using a wide bandwidth spread spectrum is an example of a suitable LPI waveform for use in the present invention.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
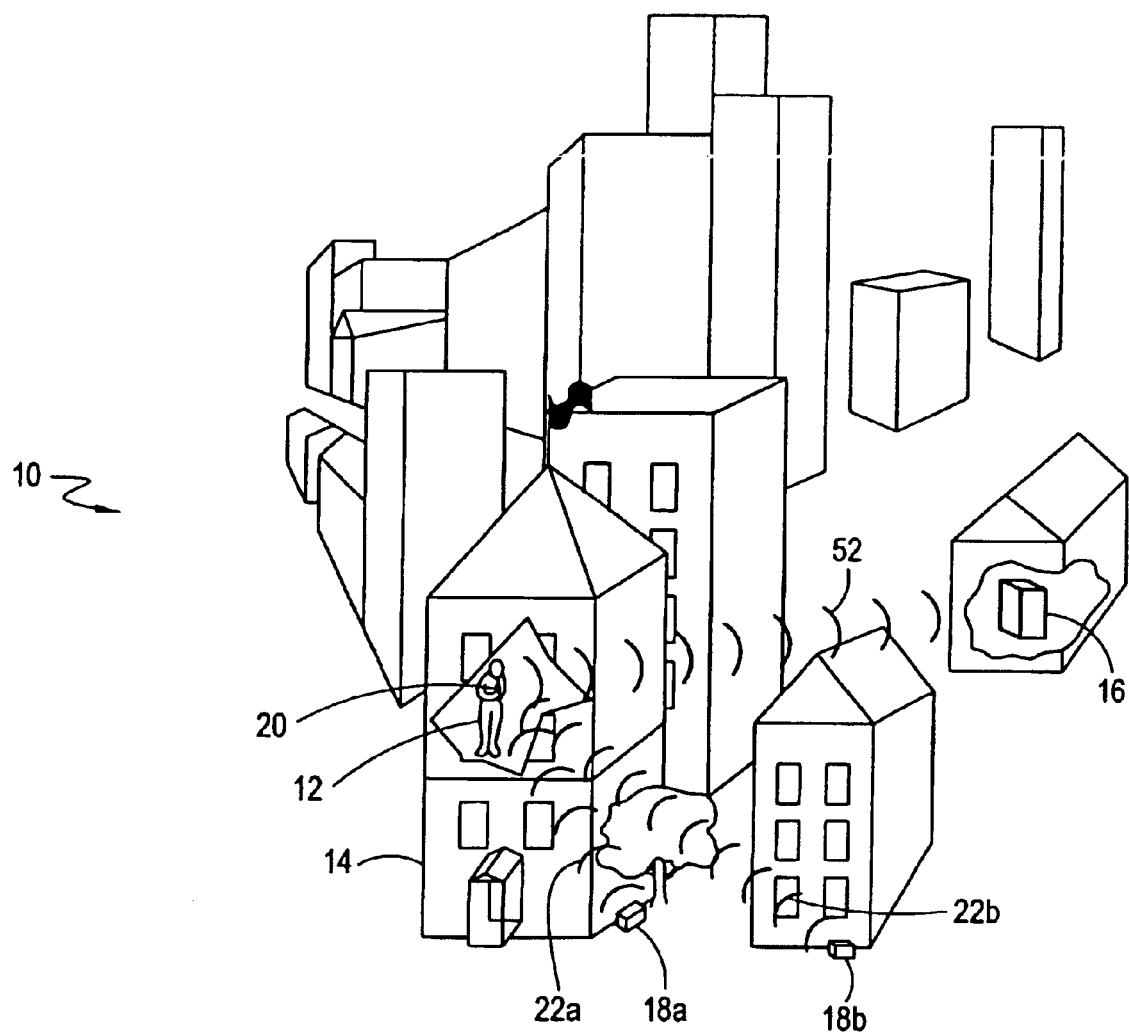
FIG. 1 is a simplified, schematic view of a locating system in accordance with the present invention shown situated in an urban environment.

Referring initially to FIG. 1, a geolocation system in accordance with the present invention is shown and generally designated 10. As shown in FIG. 1, the geolocation system 10 can be used to determine the position of a soldier 12 located inside a multistory structure 14 within an urban environment. In accordance with the present invention, the geolocation system 10 preferably includes a base site 16, a plurality of transmitters 18 (of which transmitters 18a and 18b are exemplary) and a receiver 20 that is carried by the soldier 12. In general, the transmitters 18a,b shown in FIG. 1 can be arbitrarily located as long as the transmitters 18 are mutually dispersed and their actual location is known. As detailed further below, it is contemplated for the present invention that the transmitters 18 will be dropped at outdoor locations to allow the transmitters 18 to accurately self survey using a GPS locating receiver.

The basic object of the system 10 is to accurately determine the position of the receiver 20 (and soldier 12) relative to the transmitters 18. Further, this is to be accomplished regardless of whether the receiver 20 is stationary or mobile (i.e. being carried by soldier 12). For the present invention, the transmitters 18 can be any type of communications equipment which emit electromagnetic radiation signals 22a,b (e.g. radiofrequency (RF) signals). It is contemplated for the present invention that a low frequency RF signal 22, capable of penetrating the walls and other features of buildings such as structure 14, is used. Preferably, the signal 22 has a wavelength that is substantially longer than the pertinent dimensions of typical structural features of the urban environment such as rooms, hallways, staircases and passageways between buildings to prohibit these features from acting as a waveguide for the signal 22. For example, a signal 22 with a frequency between approximately 500 kHz and approximately 2 Mhz may be used. Preferably, each transmitter 18 is synchronized with the other transmitters 18 to allow the generated signals 22a,b to be in-phase with each other as they are generated by the transmitters 18a,b. On the other hand, when the signals 22a,b reach the receiver 20, the signals 22a,b will no longer necessarily be in-phase. This is because each signal 22a,b will most likely travel a different distance to reach the receiver 20.

Figure 2:
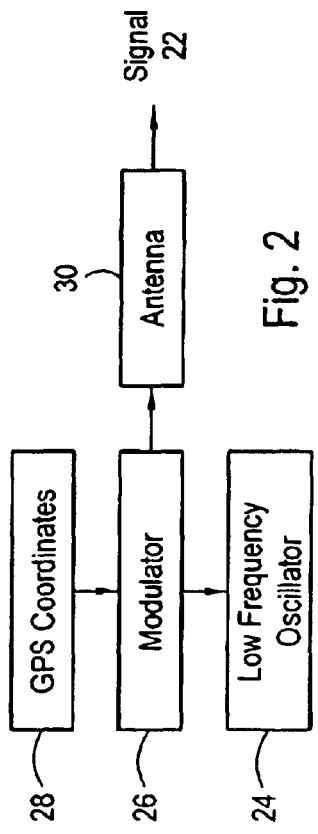
FIG. 2 is a functional block diagram showing the interactive components of a representative low frequency signal transmitter for the present invention.

The operation of a representative transmitter 18 can be best understood by cross-referencing FIGS. 1 and 2. As indicated above, for the present invention, the location of each transmitter 18 must be known. For this purpose, each transmitter 18 can be bundled with a GPS locating device to self-survey. After acquiring its own location, each transmitter 18 relays its location information (along with the low frequency signal) to the receiver 20. As shown in FIG. 2, in a preferred embodiment of the present invention, a low frequency oscillator 24 can be used to generate a low frequency signal. As further shown, a modulator 26 can be provided to modulate the transmitter location information (i.e. GPS coordinates 28) on the low frequency signal. The modulated low frequency signal 22 can then broadcast using antenna 30. This cooperation of structure allows the geolocation system 10 to accommodate an application in which the transmitters 18 are placed at outdoor locations where GPS location is accurate, yet the soldier 12 (and receiver 20) may be indoors where the accuracy of GPS is inadequate. More specifically, it is contemplated by the present invention that the transmitters 18 will be 'dropped' by the soldiers 12 at outdoor locations before entering the buildings such as structure 14 within the urban environment. With the dropped transmitters 18 positioned away from soldiers 12, hostile forces are prevented from identifying locations of soldiers 12 by homing in on the transmitters 18.

Figure 3:
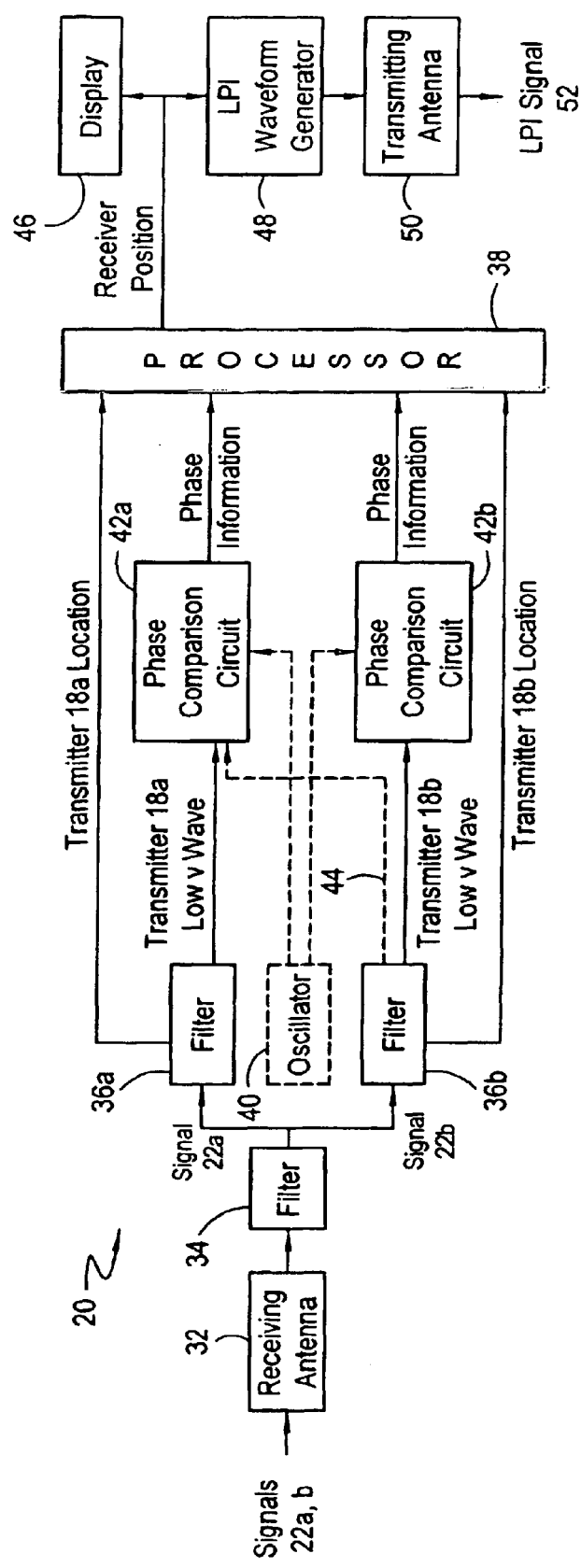
FIG. 3 is a functional block diagram showing the interactive components of a representative receiver for the present invention.

The operation of a representative receiver 20 can be best understood with reference to FIG. 3. In functional overview, the receiver 20 receives each transmitted signal 22a,b and extracts both phase related information and the transmitter location information from the signal 22a,b. The extracted phase related information and transmitter location information are then processed to determine the location of the receiver 20. As shown in FIG. 3, the receiver 20 preferably includes a receiving antenna 32 for receiving signals 22a,b and a filter 34 to sort the received signals 22a,b (i.e. to separate received signal 22a from received signal 22b). From filter 34, it can be seen that separated signal 22a is communicated to filter 36a where the transmitter location information for transmitter 18a is extracted and sent to a processor 38. Although the receiver 20 shown in FIG. 2 is configured to receive signals 22 from two transmitters 18, it is to be appreciated by those skilled in the art that the receiver 20 shown can be extended to accommodate any number of transmitters 18.

Continuing with FIG. 3, it can be seen that the receiver 20 can include an on-board oscillator 40 that is synchronized with the transmitters 18. As further shown, the output of the oscillator 40, together with the low frequency wave portion of the signal 22a from the filter 36a, are input into a phase comparison circuit 42a. The phase comparison circuit 42a measures the phase of signal 22a with respect to the on-board oscillator 40 to determine the distance that signal 22a has propagated from transmitter 18a to the receiver 20 (i.e. actual phase delays are measured). As shown, this phase information is then communicated to the processor 38. It is to be appreciated that each actual phase delay can represent several possible propagation distances, with the possible propagation distances differing by a distance equal to the wavelength of the low frequency signal 22.

With reference still to FIG. 3, it can be seen that separated signal 22b is communicated to filter 36b where the transmitter location information for transmitter 18b is extracted and sent to a processor 38. As further shown, the output of the oscillator 40 together with the low frequency wave portion of the signal 22b from the filter 36b are input into a phase comparison circuit 42b. The phase comparison circuit 42b then measures the phase of signal 22b with respect to the on-board oscillator 40 to determine the distance that signal 22b has propagated from transmitter 18b to the receiver 20. This phase information for signal 22b is then communicated to the processor 38. Thus, the processor 38 receives the phase related information and the transmitter location information from the signals 22a,b as inputs, and as detailed further below, the processor 38 uses these inputs to determine the position of the receiver 20. More specifically, the position of the receiver 20 can be determined relative to the transmitters 18 or in terms of GPS coordinates.

Referring still to FIG. 3, in an alternate embodiment of the present invention, the low frequency wave portion of the signal 22a from the filter 36a and the low frequency wave portion of the signal 22b from the filter 36b (see dotted line 44) are input into the phase comparison circuit 42a. In this embodiment, the on-board oscillator 40 and phase comparison circuit 42b are not required. The phase comparison circuit 42a measures the relative phase delay between received signal 22a and received signal 22b and communicates this phase information to the processor 38. The relative phase delay is indicative of a differential range estimate for the transmitter pair. It is to be appreciated that phase related ambiguities similar to those described above may also be present in the differential range estimate.

In each of the embodiments described above, the phase related ambiguities can be eliminated to find the real position of the receiver 20. It is to be appreciated that the number of ambiguities will depend on the wavelength of the signal 22 broadcast by the transmitter 18 and the coverage area. Several techniques can be used to reduce or eliminate the phase related ambiguities. For example, increasing the number of transmitters 18 will generally reduce the number of ambiguities. A preferred technique involves using the processor 38 to run an algorithm such as the maximum likelihood method (MLM) to eliminate the phase related ambiguities and find the real position of the receiver 20. Another technique involves determining an initial position for the receiver 20, followed by tracking the movement of the receiver 20 relative to the initial position. This technique allows for some of the ambiguous positions to be eliminated as improbable in light of any known limitations on the movement of the receiver 20. For example, it can be assumed that the soldier 12 and receiver 20 do not move faster than an average soldier's foot speed, plus a factor of safety.

As shown in FIG. 3, the processor 38 can communicate the real position of the receiver 20 to a display 46 on the receiver 20, such as an LED display, for use by the soldier 12. Also shown, the processor 38 can communicate the real position of the receiver 20 to an LPI waveform generator 48, which in turn communicates an LPI waveform containing the position information to a transmitting antenna 50. As seen with cross reference to FIGS. 1 and 3, the transmitting antenna 50 generates LPI signal 52 for transmission to base site 16. This cooperation of structure allows the soldier 12 to be located and tracked at the base site 16.

In another embodiment of the present invention (not shown), the location of the soldier 12 is calculated at the base site 16. For this embodiment, the processor 38 is located at the base site 16 and the location of each transmitter 18 is communicated directly to the base site 16. The receiver 20 receives a low frequency signal 22 from each transmitter 18 and extracts phase related information from the signal 22. The receiver 20 then encodes the phase related information on an LPI waveform and transmits the encoded LPI waveform to the base station 16. At the base station 16, the processor 38 uses the phase related information and transmitter location information to calculate the position of the soldier 12 (and receiver 20).

While the particular Urban Terrain Geolocation System as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for locating a moveable target inside a structure in an urban area, wherein the area is characterized by a feature size, said system comprising:
 at least one transmitter for transmitting an electromagnetic signal into the urban area from a predetermined location, with said signal having a wavelength, $\lambda$, longer than said feature size, wherein a signal path distortion of said signal is caused by said structure and is characterized by said signal wavelength, $\lambda$;
 a receiver positioned on said moveable target in the structure for receiving said electromagnetic signal from said transmitter, wherein said received electromagnetic signal includes phase information indicative of the location of the target relative to said transmitter and dependent on said signal path distortion; and
 means for using said phase information in said electromagnetic signal to calculate the location of the target.

2. A system as recited in claim 1 wherein said electromagnetic signal has a Low Probability of Intercept (LPI) waveform.

3. A system as recited in claim 1 wherein said system comprises a plurality of transmitters and said system uses a GPS signal to self-synchronize said plurality of transmitters.

4. A system as recited in claim 1 wherein said means for using said phase information comprises:
 an oscillator mounted on said target for measuring a phase for said signal; and
 a processor for using said phase to calculate the location of the target.

5. A system as recited in claim 4 wherein said processor is positioned on the target.

6. A system as recited in claim 4 wherein said processor is positioned at a distance from the target, and said system further comprises a transmitter positioned at the target for transmitting said phase information to said processor via a signal having a Low Probability of Intercept (LPI) waveform.

7. A system as recited in claim 6 wherein said Low Probability of Intercept (LPI) waveform is a burst using a wide bandwidth spread spectrum.

8. A system for locating a moveable target in a structure within an urban area, said system comprising:
 a plurality of transmitters dispersed at predetermined locations, with each said transmitter configured to transmit an electromagnetic signal having a wavelength, $\lambda$, into the structure wherein said wavelength $\lambda$, is longer than 150 meters to allow each said signal to penetrate the structure, wherein a signal path distortion of said signal is caused by said structure and is characterized by said signal wavelength, $\lambda$;
 a receiver positioned on said target for receiving each said signal from said transmitters, wherein each said received signal includes phase information indicative of the location of the target relative to each respective said transmitter and dependent on said signal path distortion; and
 means for using said phase information in said signals to calculate the location of the target.

9. A system as recited in claim 8 further comprising a plurality of GPS receivers, with one said GPS receiver mounted on each said transmitter to synchronize each said transmitter with respect to at least one other said transmitter.

10. A system as recited in claim 8 further comprising a plurality of GPS receivers, with one said GPS receiver mounted on each said transmitter to determine the location of each said transmitter.

11. A system as recited in claim 10 wherein each transmitter further comprises a means for modulating the respective transmitter's location onto said signal transmitted by said respective transmitter for receipt by said receiver.

12. A system as recited in claim 11 wherein said receiver further comprises a means for demodulating each transmitter's location from said received signals.

13. A system as recited in claim 8 wherein said system further comprises a base site and wherein said receiver further comprises a means for generating a Low Probability of Intercept (LPI) waveform containing said phase information from said signals and transmitting said LPI waveform for receipt by said base site.

14. A system as recited in claim 8 wherein said means for using said phase information in said signals to calculate the location of the target is a processor mounted on said receiver and wherein said system further comprises a base site and wherein said receiver further comprises a means for generating a Low Probability of Intercept (LPI) waveform containing said calculated target location and transmitting said LPI waveform for receipt by said base site.

15. A system as recited in claim 8 wherein said means for using said phase information in said signals to calculate the location of the target is a processor mounted on said receiver and wherein said receiver further comprises a display for displaying said calculated target location.

16. A system as recited in claim 8 wherein said means for using said phase information in said signals to calculate the location of the target is a processor configured to process a Maximum Likelihood Method (MLM) algorithm to eliminate phase-related location ambiguities.

17. A method for locating a moveable target in a structure within an urban area, said method comprising the steps of:

transmitting signals into the urban area from a plurality of dispersed, predetermined locations, with each said signal having a wavelength, $\lambda$, wherein said wavelength $\lambda$ is longer than 150 meters to allow each said signal to penetrate the structure, wherein a signal path distortion of said signal is caused by said structure and is characterized by said signal wavelength, $\lambda$;

receiving said signals at said target, said received signal including phase information indicative of the location of the target relative to each said predetermined transmitting location and dependent on said signal path distortion; and using said phase information in said signals to calculate the location of the target.

18. A method as recited in claim 17 further comprising the step of using a plurality of GPS receivers to determine the location of each said predetermined transmitting location.

19. A method as recited in claim 17 further comprising the step of transmitting a Low Probability of Intercept (LPI) waveform containing said phase information from said target location for receipt by a base site.

20. A method as recited in claim 17 wherein said step of using said phase information in said signals to calculate the location of the target is performed at said target location and wherein said method further comprising the step of transmitting a Low Probability of Intercept (LPI) waveform containing said calculated location of the target from said target location for receipt by a base site.

21. A method as recited in claim 17 wherein said step of using said phase information in said signals to calculate the location of the target includes the step of processing a Maximum Likelihood Method (MLM) algorithm to eliminate phase-related location ambiguities.

* * * * *